W. H. SMYTH.
METHOD OF UTILIZING ENERGY DERIVED FROM RAPID COMBUSTION.
APPLICATION FILED OCT. 13, 1902.

1,064,178.

Patented June 10, 1913.
4 SHEETS—SHEET 2.

Witnesses:
Inventor:
William H. Smyth.

W. H. SMYTH.
METHOD OF UTILIZING ENERGY DERIVED FROM RAPID COMBUSTION.
APPLICATION FILED OCT. 13, 1902.

UNITED STATES PATENT OFFICE.

WILLIAM H. SMYTH, OF BERKELEY, CALIFORNIA, ASSIGNOR TO HUMPHREY GAS PUMP COMPANY, A CORPORATION OF NEW YORK.

METHOD OF UTILIZING ENERGY DERIVED FROM RAPID COMBUSTION.

1,064,178.

Specification of Letters Patent. Patented June 10, 1913.

Application filed October 13, 1902. Serial No. 127,172.

*To all whom it may concern:*

Be it known that I, WILLIAM H. SMYTH, a citizen of the United States, residing at Berkeley, in the county of Alameda and State of California, have invented certain new and useful Improvements in Methods of Utilizing Energy Derived from Rapid Combustion; and I do hereby declare the following to be a full, clear, and exact description of the same.

This invention relates to a new method or process of raising or moving water. In addition to its application to moving water, it includes the utilizing of energy, derived from explosions generally.

The particular application used herein for the purposes of this disclosure is one expression; the compression of air is another, to which it is equally applicable. The generation of power for motive purposes generally, is still another expression of its utilization of heat energy.

It has been my object to make the invention underlying the present disclosure available for all forms of pumping.

This invention is of so generic and pioneer a character and the conditions of its use are so diverse that many new arts and types of apparatus grow out thereof and constitute separate patentable subject matter. This is exemplified in certain copending applications to which reference is here made.

Applicant refers to his copending applications and patents as follows:—Application filed Oct. 13, 1902, Serial No. 127,173 describes and claims apparatus and means for effecting the present invention. Application filed Feb. 5, 1900, Serial No. 4127, describes and claims broadly his invention in the art of utilizing heat energy, by the expansion of combustible charges against liquid, moving a body of liquid by the action of said expansion, and compressing fresh expansible charges by energy derived from previous expansions. Application filed Feb. 5, 1900, Serial No. 4128 describes and claims apparatus and means for effecting the invention described in his application No. 4127. Application filed Feb. 5, 1900, Serial No. 4129 describes and claims special form of apparatus in the same art, in which for example, a combustion chamber is provided with an igniter, and means are provided to regulate the in and outflow of liquids, with an air chamber surrounding the combustion chamber, having an inlet passage thereto and a discharge from the air chamber. Application filed Aug. 4, 1903, Serial No. 168,233 describes a special form of apparatus in the same art in which there is provided, for example, a cylinder with an independent piston, a charge chamber attached to the cylinder provided with a pump suitably placed to engage the piston and to be operated thereby and introduce fuel into the cylinder, the cylinder and piston being suitably arranged to compress the charge by the momentum of the piston. Patent No. 936,677 dated Oct. 12, 1909 and Patent No. 950,082 dated Feb. 22nd, 1910, describe means relating to the same art.

This invention may be carried into effect by many forms of apparatus and may be employed under many different circumstances in which it is desired or necessary to raise or move water, compress air or furnish motive power.

One simple form of means for effecting this invention, and by which its objects may be accomplished is illustrated in the accompanying drawings, in which:—

Referring to the drawings, 1 is an explosion chamber provided at its upper end with an air inlet valve 2. Any suitable means for supplying fuel may be provided. One such is shown in the present illustration as consisting of a piston 3 in a cylinder 4 open inwardly to the explosion chamber and a spring 5 resting against the piston. This piston 3 operates the plunger pump 6, which has pipe connections to a suitable source of fuel, and also through check valve 7 to the explosion chamber. The plunger of this pump is shown as a piston rod attached to piston 3. A device to limit the motion of piston 3 is provided, which is illustrated herein as a rod 8 attached to piston 3 and extending to the exterior of the explosion chamber where it is supplied with a threaded stop 9 and operating handle 10.

Figure 1:
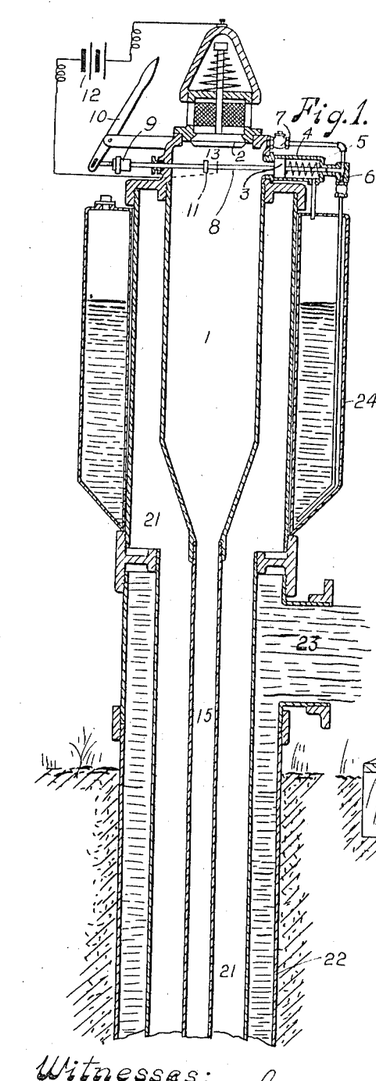
Figure 1 is a vertical section of the upper portion of one form of the apparatus.

An igniting device of any suitable character is provided. One such is illustrated in Fig. 1, in which a tappet or projection extending laterally from the side of rod 8, as shown at 11, forms a wiper and one of the electrodes of a suitable electric battery 12. The other electrode 13 consists of an ordinary flat spring in the path of movement of the wiper 11, see Fig. 1, and is attached to a suitably insulated plug 14 which passes to the outside of the explosion chamber 1, see Fig. 2.

Figures 3, 4:
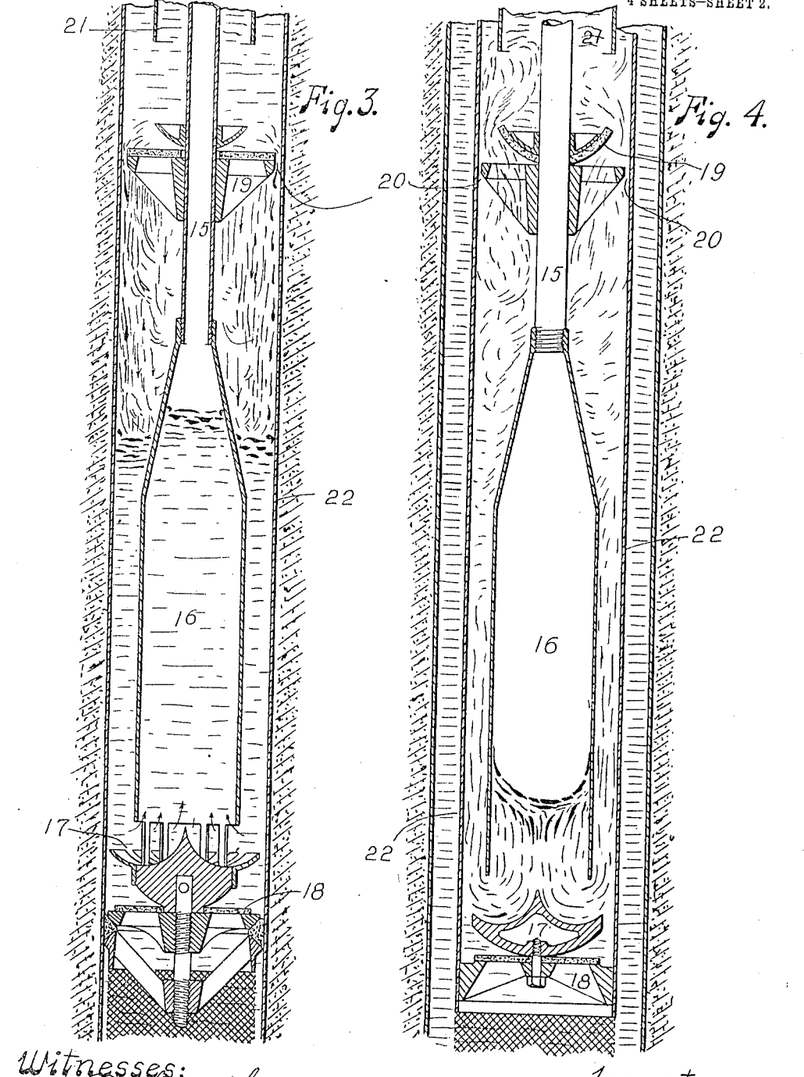
Fig. 3 is a vertical section of the lower portion of the same apparatus to which Fig. 1 refers.
Fig. 4 is a vertical section of the lower portion of the same apparatus to which Fig. 2 refers.

Extending downwardly from and as a continuation of the explosion chamber 1 is a pipe 15 of a length to suit the requirements of the situation or condition under which the device is to operate. The lower end of this pipe is preferably enlarged to form an expansion chamber 16 and it is open at the bottom to permit outflow therefrom. Adjacent to the lower end of 16 is a deflector 17 shown in the present instance as a concave ring or annulus. Below this deflector is provided a suitable valve 18. A short distance from the expansion chamber 16 is provided an outwardly opening valve 19. For reasons which will hereinafter be described, this valve 19 is arranged to act only as a partial or temporary check leaving the discharge passage of the liquid always, at least partly, open for the return of the liquid. This opening may vary as to size. An air chamber 21, preferably formed around the pipe 15 and the explosion chamber 1, is provided. It is shown in the present instance as a pipe extending from near the top of the explosion chamber down to a short distance above the valve 19, and being open at its lower extremity. Surrounding the expansion chamber is the pipe 22, which in this form may serve also as a well casing as shown in Figs. 1 and 3. An outlet 23 of any suitable character is provided in this pipe. In Fig. 1, I have also shown a liquid fuel tank 24, which for convenience is made of annular shape and rests upon and around the upper portion of air chamber 21.

As will be seen from the drawings, in the forms illustrated, the pipe 22 is in effect a discharge pipe for the whole of its length, that is from the inlet valve 18 to the discharge aperture 23. It however at times during the operation, performs other functions than merely acting as a discharge conduit. The lower part for example and for an indefinite distance upward from the inlet valve 18, performs the function with chamber 16 of an expansion chamber. It also performs the functions of an inlet pipe. These various capacities of the pipe make it difficult to separate the inlet pipe, the expansion chamber and the discharge pipe as in the present form, the functions of these various devices happen to be all performed by pipe 22. It is not however necessary that these various functions should be performed by the same pipe. It is thus more convenient for the purpose of the description to consider the pipe 22 from end to end and so describe it as a discharge pipe, than to designate various undefined portions by names indicating functions which during the operation these parts perform, in addition to the general function of being a discharge conduit for the water which passes into the structure.

Figure 2:
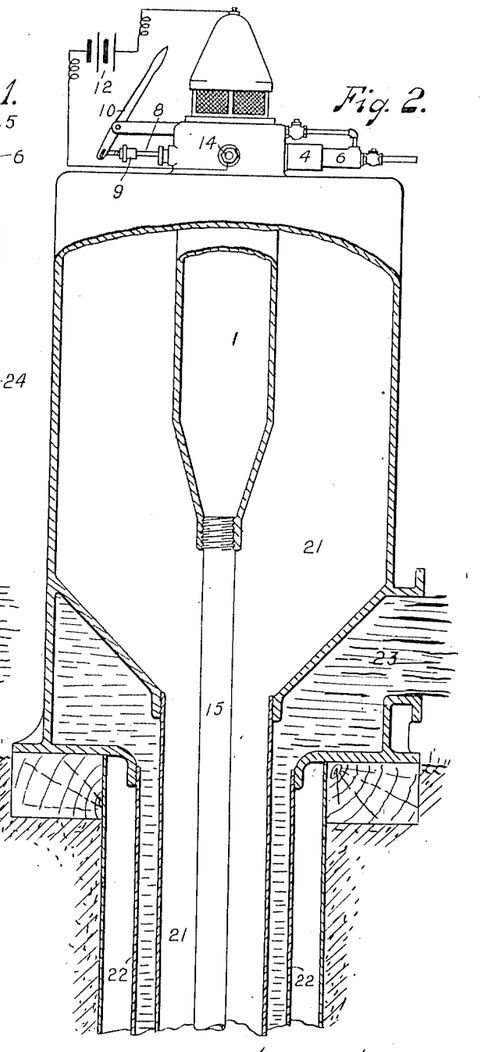
Fig. 2 is an elevation partly in section of a modification.

The preceding description refers particularly to Figs. 1 and 3 though it is applicable also to Figs. 2 and 4 with the exception that in the latter case, the outer pipe 22 is independent of the well casing and is an integral part of the apparatus and removable from the well therewith. In this latter form no special fuel supply is shown as this is intended to be located at any suitable or convenient place.

Figure 7:
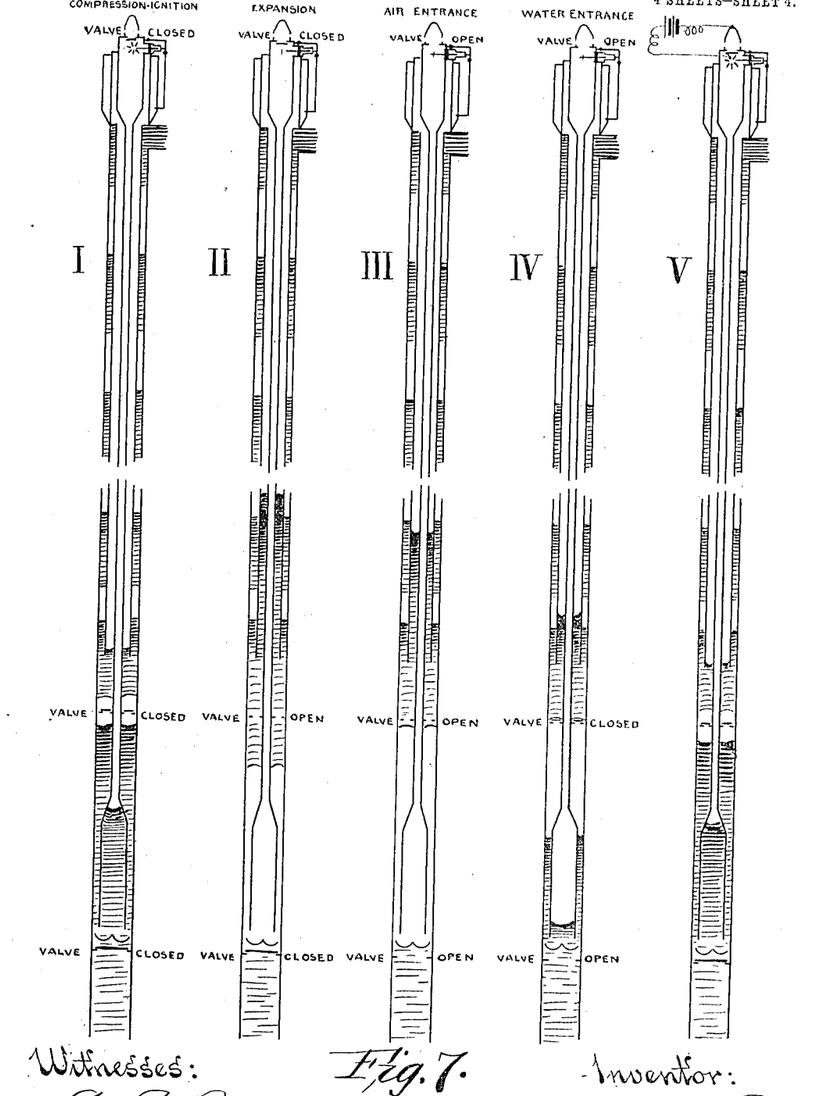
Fig. 7 is a series of diagrams showing the cycle of operations or steps in the process as carried into effect in the apparatus shown on Figs. 1, 2, 3 and 4.

The cycle of operation and the steps of the process as exemplified in the apparatus, are illustrated in the diagrammatic series Fig. 7, in which, for simplicity and clearness, the details of mechanical construction have been omitted.

I shows the charge in the explosion chamber under compression and just sparked. It also shows the volume of air trapped in the casing rising with the column.

II shows the expansion of the charge and the displacement of the water in the expansion chamber and casing thereto. It further shows the compression of air by the entrance of the water piston into the air chamber.

III shows the condition of partial vacuum existing in the explosion and expansion spaces and the consequent entrance of atmospheric air into the explosion and expansion spaces filling them with air at atmospheric pressure having in its passage scavenged the spent gas from the explosion space. This diagram also shows the highly compressed air in the air chamber discharging some of the water into the discharge column. It also shows the water entrance valve open permitting the entrance of fresh water.

IV shows water having entered and trapped a volume of air in the casing and commencing to rise in the expansion chamber.

V shows the return of the water due to the pressure of the head or the resilience of the cushion; closing of the suction valve; the compression of the charge in the explosion chamber. In fact this diagram shows the end of the cycle of operations as diagram I shows the beginning and they are consequently alike.

Under the conditions indicated in the drawings, the operation of the apparatus will be as follows:—The explosion chamber 1 being supplied with air at a pressure above atmosphere caused in a manner hereinafter described, fuel is introduced into it by the pump 6 operated by the compressed air acting upon piston 3. A spark is caused by the contact breaking of the sparking devices 11 and 13 and the explosive mixture formed of the air and the fuel being thereby inflamed will generate heat within the explosion chamber 1 and cause a great expansion of the gases therein contained. The charge expands in the explosion chamber and expansion chamber 16 and thus displaces the contained water driving it out thereof into the discharge casing and air chamber 21. Continued expansion of the gases forces the water so that it compresses the contained air which is already compressed to or above the pressure of the head. The return or rebound of the water is retarded or controlled by the valve 19. The gases in the explosion chamber 1 and expansion chamber 16 having parted with energy in performing the work of forcing the water into the air chamber 21 are now unable to sustain the atmosphere pressing upon the outside of the valve 2 at the top of the explosion chamber. Atmospheric pressure consequently forces the valve 2 open, and air enters the explosion and expansion spaces carrying the spent gases forward and filling these spaces with spent gas and air to a pressure practically that of atmosphere. Thus the spent gas is scavenged from and the explosion space is filled with pure air. The expansion chamber 16 being in the present form below the normal supply water level, water flows through the valve 18 and compresses the air in the expansion chamber 16 and in the casing 22 below the valve 19 to a degree commensurate with the gravity of the water. At the same time the incoming water separates the contained air in the expansion chamber 16 from that in the casing 22 and traps in the latter a volume of air. The valve 19 being, as stated, an imperfect check or temporary restraint only, permits the back flow or rebound of the water due to the head and the resilience of the cushion. This compresses the air in the expansion and explosion spaces. The air trapped in the casing meanwhile passes upward into the column. Of course during these described steps the augmented pressure in the air chamber 21 due to the explosive energy, is asserting itself to drive out the water into the discharge casing 22 and to its exit 23 above the surface. The recompression of the air in the explosion chamber 1 is the condition started with, so it again operates the fuel supply and sparker devices and thus repeats indefinitely the cycle of operations.

At each operation, a volume of water and a volume of air are forced into the discharge column. Each volume of air diminishes the specific gravity of the combined column of air and water constituting the discharge stream, shown by shaded and black parts in Figs. 5 and 6. Not only does the discharge column diminish in specific gravity but it is transformed from a solid incompressible inert column into a resilient cushion readily compressible by a sudden and energetic blow. In other words the discharge column is transformed from a solid incompressible mass of great specific gravity into a sensitive continually renewing spring of less specific gravity peculiarly adapted to receive and store up in itself the energy generated in the explosion chamber and return it in the form of useful work. It is obvious of course that in starting up the first time there is no head due to an outflowing stream, nevertheless there is some compression both in the air chamber and in the explosion chamber due to submergence. This performs the same function of prior compression of charge that the head performs to an added degree, in fact it is head, so far as this function is concerned. As the water rises in the discharge column, so the prior compression increases in like ratio, therefore in starting up for the first time, all that is necessary is to introduce and ignite a charge by means of the handle 10 or prime the discharge pipe with water.

Figure 5:
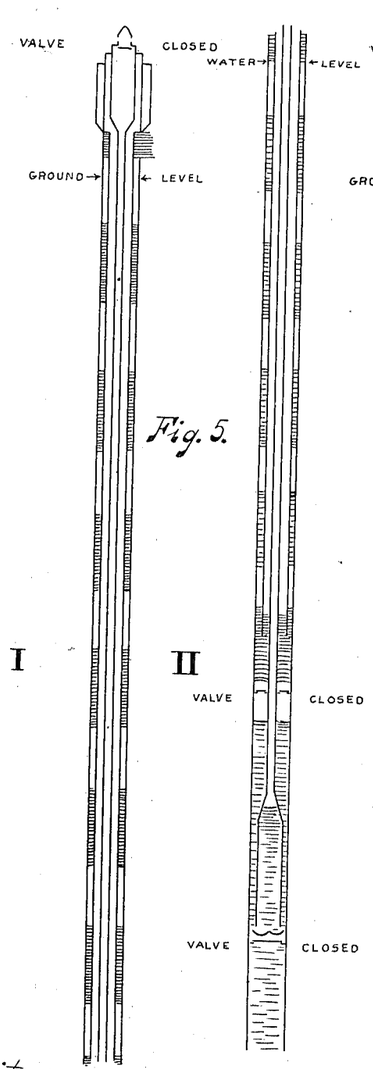
Fig. 5 is a diagrammatic representation of the apparatus, illustrated in Figs. 1 and 3, in operation. The diagram being in two parts I and II which are longitudinal continuations of each other placed side by side for convenience of illustration.
Figure 6:
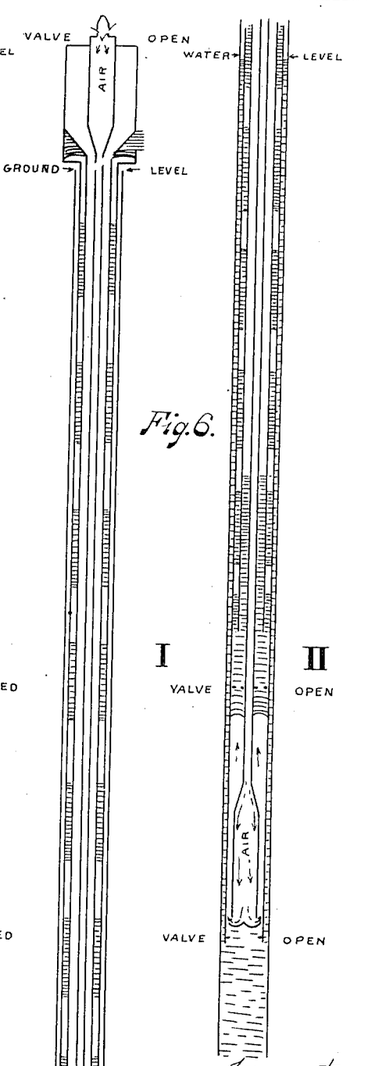
Fig. 6 is a similar diagram referring to the apparatus illustrated in Figs. 2 and 4, the parts of which are marked I and II.

The diagrams Figs. 5 and 6 are intended to illustrate the condition or resilient character of the discharge stream and also the fact that as the entrapped and compressed air rises toward the surface, it gradually expands with a consequent acceleration of the speed of the discharge water. This latter fact is illustrated by the increased space occupied by air as compared with the uniform space occupied by water from the bottom of the column to the top. Diagram, Fig. 5 also illustrates the location of the discharge stream as being between the air chamber and the well casing. Diagram, Fig. 5 further represents that stage in the process which this apparatus carries into effect in which the compressed gases are ready to be ignited and the trapped volume of air is just ascending into the discharge column by reason of its buoyancy. Diagram, Fig. 6 shows the resilient discharge column located between the air chamber and an outer pipe integral with the pump and independent of the well casing. Diagram, Fig. 6 also shows a water level in the well. This level is the same in Fig. 5 though owing to the form of the apparatus it is not perceivable except in its effect. Diagram, Fig. 6 further illustrates that stage in the process at which the complete expansion has taken place and the air inlet valve is open so that the atmospheric pressure is supplementing the waning pressure due to explosive energy resulting in greater travel of the water pistons.

It has been stated in the foregoing description that the explosion chamber 1 and pipe 15 are preferably located within the air chamber and that the air chamber extends downward to near the bottom of the well. In the first place the explosion chamber is surrounded by an efficient non-conductor which conserves the heat and consequent energy of the inflaming gases and further this non-conductor is not of merely passive character such as is placed for example around steam pipes but is of such a character in its present association that whatever heat is conveyed through the walls of the explosion chamber and conducting pipe is taken up and utilized by the air in the air chamber and transformed into useful work in the form of pressure upon the ascending column of water. This arrangement thus gives ideal conditions for the utilization of the heat energy generated within the explosion chamber.

This invention also presents ideal conditions for the utilization of energy in that it provides for the following requirements for the economical utilization of energy as displayed in explosive action:—High initial cylinder temperature and pressure; low terminal cylinder temperature and pressure; expansion to below atmospheric pressure; neutralizing unbalanced atmospheric pressure by atmospheric balancing; conditions to prevent heat dispersion except in effective work; utilizing heat radiated from or conducted through the walls of an explosion chamber in effective work; compression of charge prior to ignition; prior compression of charge in proportion to or greater than the resistance to be met by the expansion of the inflaming charge; compression automatically produced, regulated and controlled by the resistance to be overcome; diminishing the specific gravity of a water column; transforming a column of water into a resilient cushion; initial piston speed unlimited and comparable to the unrestrained speed of expansion of inflaming gas; immediate conversion and storing of energy due to inflaming; expansion commensurate with varying initial temperatures; a piston of extreme mobility and sensitively responsive to initial pressure of an inflaming charge; transmitting association between a piston and power utilizing means in which the resistance to be overcome is applied with increasing instead of diminishing intensity commencing at nil; diluting the products of combustion with a large volume of air; complete scavenging of spent or used gases. As therefore this disclosure introduces in useful expression such broadly novel principles, functions and effects for the utilization of the energy of explosive action and their application to raising and moving of water, it is not desired that the invention be limited to the forms, proportions or arrangements of the parts herein illustrated or any particular mechanical expression thereof, but I desire to claim the invention or inventions herein in the broadest manner as a pioneer invention.

What I claim is:—

1. The method of utilizing energy derived from explosions which consists in sustaining a column of material directly upon an explosive, reducing the specific gravity of the sustained material and rendering it resilient, and expanding said explosive by ignition after the specific gravity of sustained material has been reduced.

2. The method of utilizing energy derived from explosions which consists in sustaining a column of liquid directly upon a resilient explosive, reducing the specific gravity of the sustained liquid and rendering it resilient and expanding said explosive by ignition after the specific gravity of sustained liquid has been reduced.

3. The herein described process of inducing the flow of liquid from a well which consists in aerating a column of liquid and applying explosive energy to the bottom of the aerated portion of the column of liquid after aerating.

4. The method of utilizing energy derived from explosions which consists in raising water by supporting the water to be raised directly upon an explosive gas, introducing a volume of air into the supported water and igniting the gas.

5. The method of utilizing energy derived from explosions which consists in raising water by supporting the column to be raised directly upon an explosive gas in an inclosed chamber, reducing the gravity of the supported column before ignition by the introduction of an elastic fluid of less specific gravity thereinto and igniting the gas.

6. The process of raising water by energy derived from explosions which consists in inclosing an explosive charge within a chamber, supporting the water upon an elastic cushion, compressing the explosive charge, expanding the charge by ignition against the elastic cushion and reducing the specific gravity of the water to be raised by the introduction thereinto of the products of explosion.

7. The process of raising water by energy derived from explosions which consists in inclosing an explosive charge within a chamber, supporting the water to be raised upon an air cushion in said chamber before the introduction of the charge and reducing its specific gravity, interposing a freely movable body between the charge and an air cushion, compressing the charge by the resilient force of the air cushion, firing the charge.

8. The method of utilizing energy derived from rapid combustion which consists in moving a water piston by the expansion of the products of combustion and admitting atmospheric pressure upon the same side of the piston as the pressure of the products of combustion.

9. The method of utilizing energy derived from explosions which consists in interposing a liquid piston between an explosive charge and an elastic cushion, inflaming said charge and permitting it to expand against the cushion and permitting atmospheric pressure access to the expanding charge.

10. The process of raising water by energy derived from explosions which consists in inclosing a gas within a chamber, causing the water to be raised to be supported by said gas, expanding said gas against a resilient cushion interposed between it and the water to be raised, admitting atmospheric pressure and air to the expanding gases and reducing the specific gravity of the water to be raised by mingling air with it.

11. The process of raising water by energy derived from rapid combustion which consists in moving an unconnected piston by the expansion of the products of combustion filling the expansion space with atmospheric air during expansion and separating a portion of said air to form a subsequent charge.

12. The method of utilizing energy derived from rapid combustion which consists in moving an unconnected piston against a resilient cushion by the expansion of the products of combustion, admitting atmospheric air and pressure to the expansion space during expansion and separating a portion of the admitted air to form a subsequent charge.

13. The method of utilizing energy derived from rapid combustion which consists in moving a liquid piston by the expansion of the products of combustion, admitting atmospheric air and pressure to the expansion space during the expansion and separating a portion of the admitted air to form a subsequent charge.

14. The method of utilizing energy derived from rapid combustion which consists in moving a liquid piston against a resilient cushion by the expansion of the products of combustion, admitting atmospheric air and pressure to the expansion space during expansion and separating a portion of the admitted air to form a subsequent charge.

15. The method of utilizing energy derived from rapid combustion which consists in moving liquid by the expansion of the products of combustion, interposed between an unconnected piston and a volume of water to be raised, admitting atmospheric air and pressure to the expansion space during expansion and separating a portion of the admitted air to form a subsequent charge.

16. The method of utilizing energy derived from explosions which consists in interposing an unconnected piston between a gaseous charge and a volume of water to be raised, moving the piston against a resilient cushion by the expansion of the gaseous charge, admitting atmospheric air and pressure to the expansion space during expansion and separating a portion of the admitted air to form a subsequent charge.

17. The method of utilizing energy derived from explosions which consists in interposing a liquid piston between a gaseous charge and a volume of water to be raised, moving the piston against a resilient cushion by the expansion of the gaseous charge, admitting atmospheric air and pressure to the expansion space during expansion and separating a portion of the admitted air to form a subsequent charge.

18. The method of utilizing energy derived from rapid combustion in the raising of water which consists in moving an unconnected piston by the expansion of the products of combustion, admitting atmospheric air and pressure to the expansion space during expansion and separating a portion of the admitted air to form a subsequent charge, the remaining portion of the admitted air being utilized to reduce the specific gravity of the water to be raised.

19. The method of utilizing energy derived from rapid combustion in the raising of water which consists in moving an unconnected piston against a resilient cushion by the expansion of the products of combustion, admitting atmospheric air and pressure to the expansion space during expansion and separating a portion of the admitted air to form a subsequent charge, the remaining portion of the admitted air being utilized to reduce the specific gravity of the water to be raised.

20. The method of utilizing energy derived from rapid combustion in the raising of water which consists in moving a liquid piston by the expansion of the products of combustion, admitting atmospheric air and pressure to the expansion space during expansion and separating a portion of the admitted air to form a subsequent charge, the remaining portion of the admitted air being utilized to reduce the specific gravity of the water to be raised.

21. The method of utilizing energy derived from rapid combustion in the raising of water which consists in moving a liquid piston against a resilient cushion by the expansion of the products of combustion, admitting atmospheric air and pressure to the expansion space during expansion and separating a portion of the admitted air to form a subsequent charge, the remaining portion of the admitted air being utilized to reduce the specific gravity of the water to be raised.

22. The method of utilizing energy derived from explosions in the raising of water which consists in interposing an unconnected piston between a gaseous charge and a volume of water to be raised, moving the piston by the expansion of the gaseous charge, admitting atmospheric air and pressure to the expansion space during expansion and separating a portion of the admitted air to form a subsequent charge, the remaining portion of the admitted air being utilized to reduce the specific gravity of the water to be raised.

23. The method of utilizing energy derived from explosions in the raising of water which consists in interposing an unconnected piston between a gaseous charge and a volume of water to be raised, moving the piston against a resilient cushion by the expansion of the gaseous charge, admitting atmospheric air and pressure to the expansion space during expansion and separating a portion of the admitted air to form a subsequent charge, the remaining portion of the admitted air being utilized to reduce the specific gravity of the water to be raised.

24. The method of utilizing energy derived from explosions in the raising of water which consists in interposing a liquid piston between a gaseous charge and a volume of water to be raised, moving the piston against a resilient cushion by the expansion of the gaseous charge, admitting atmospheric air and pressure to the expansion space during expansion and separating a portion of the admitted air to form a subsequent charge, the remaining portion of the admitted air being utilized to reduce the specific gravity of the water to be raised.

25. The method of utilizing energy derived from explosions in the raising of water which consists in interposing a liquid piston between a gaseous charge and a volume of water to be raised, moving the piston by the expansion of the gaseous charge, admitting atmospheric air and pressure to the expansion space during expansion and separating a portion of the admitted air to form a subsequent charge, the remaining portion of the admitted air being utilized to reduce the specific gravity of the water to be raised.

26. The method of utilizing energy derived from explosions which consists in introducing a volume of air beneath a column of water, separating a portion of the air and expanding it by heat and utilizing the remainder of the air to reduce the specific gravity of the column whereby the column of water is raised.

27. The method of utilizing energy derived from explosions which consists in introducing a volume of air beneath a column of water, separating a portion of the air by an interposed volume of water and expanding it by heat, and utilizing the remainder of the air to reduce the specific gravity of the column whereby the column of water is raised.

28. The method of utilizing energy derived from explosions which consists in introducing a volume of air beneath a column of water, separating a portion of the air and rendering it explosive, utilizing the remainder of the air to reduce the specific gravity of the water column and igniting the explosive.

29. The process of moving liquid which consists in bringing a combustible charge against a body of liquid, compressing and then expanding the charge, thereby moving the liquid to force liquid to a greater head or pressure and utilizing pressure of returning liquid to introduce and compress a combustible charge.

30. The process of moving liquid which consists in bringing a combustible charge against a body of liquid, compressing and then expanding the charge, thereby moving the liquid to force liquid to a greater head or pressure and utilizing pressure of returning liquid to introduce, compress and ignite a combustible charge.

31. The process of moving liquid which consists in bringing a combustible charge against a body of liquid, compressing and then expanding the charge, thereby moving the liquid against a resilient cushion to compress the same and to force liquid to a greater head or pressure and utilizing pressure of returning liquid to introduce a combustible charge.

32. The process of moving liquid which consists in bringing a combustible charge against a body of liquid, compressing and then expanding the charge, thereby moving the liquid to force liquid to a greater head or pressure and utilizing pressure of returning liquid to introduce a combustible charge and entrapping air with the liquid with each expansion of a combustible charge to reduce the specific gravity of the liquid column.

33. The process of moving liquid which consists in bringing a combustible charge against a body of liquid, compressing and then expanding the charge, thereby moving the liquid to force liquid to a greater head or pressure and utilizing pressure of returning liquid to introduce a combustible charge and entrapping air with the liquid with each expansion of a combustible charge to reduce the specific gravity of the liquid column and render the same resilient.

34. The process of moving liquid which consists in bringing a combustible charge against a body of liquid, compressing and then expanding the charge, thereby moving the liquid to force liquid to a greater head or pressure and permitting a partial back flow of liquid, after the force of each expansion is expended, to introduce a combustible element.

35. The process of moving liquid which consists in bringing a combustible charge against a body of liquid, compressing and then expanding the charge, thereby moving the liquid to force liquid to a greater head or pressure and permitting a partial back flow of liquid, after the force of each expansion is expended, to introduce a combustible element and to compress and ignite the charge.

36. The process of moving liquid which consists in bringing a combustible charge against a body of liquid, compressing and then expanding the charge, thereby moving the liquid to force liquid to a greater head or pressure and utilizing pressure of returning liquid to introduce a combustible charge and utilizing each impulse to force liquid to greater head or pressure, to introduce fresh liquid and to entrap air and carry same along with the liquid.

WILLIAM H. SMYTH.

Witnesses.
  A. B. BOWERS,
  J. H. MILLER.

---

Copies of this patent may be obtained for five cents each, by addressing the "Commissioner of Patents, Washington, D. C."